Patented Dec. 17, 1935

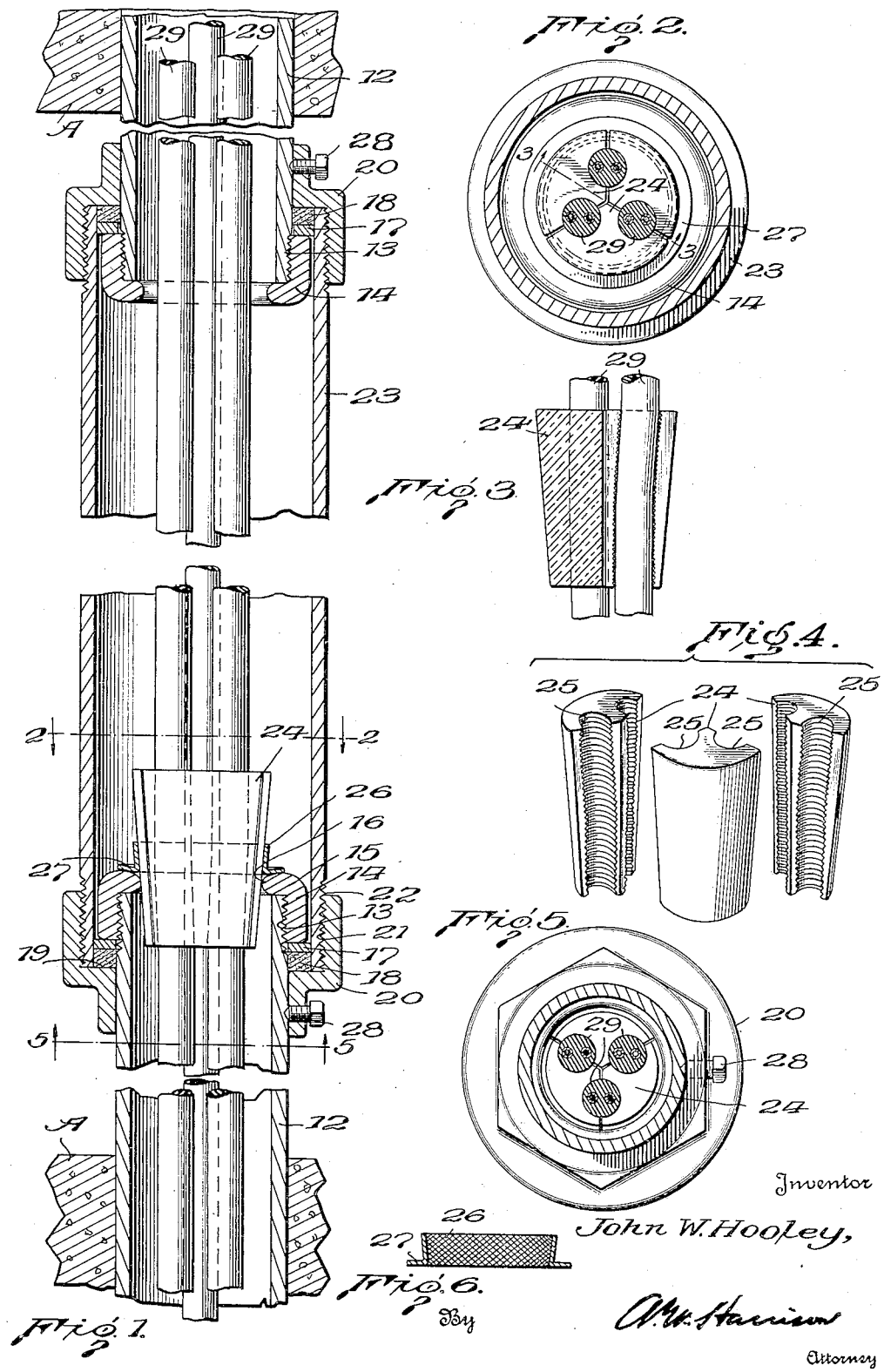

2,024,862

UNITED STATES PATENT OFFICE 2,024,862

EXPANSION COUPLING FOR CABLE CONDUITS

John W. Hooley, Larchmont, N. Y.

Application February 16, 1933, Serial No. 657,122

7 Claims. (Cl. 247—8)

This invention relates to means for so connecting the conduits for electric cables or wires that, at desired intervals, spaces can be caused to temporarily give access to any one of such spaces to enable operations to be performed as hereinafter described, and which space or spaces can then be closed so that the conduits will be continuous. Such connecting means or couplings are commonly known as junction sleeves.

In the customary way of running conduits for electrical cables or wires heretofore, it has been necessary to insert junction boxes or pull boxes at predetermined points for the reason that the fire underwriters' and the electric code requirements call for cables which, when run in a vertical position in conduits are required to be supported at predetermined points, and these points are determined by the length of the run and the size of the cables. In long runs the resistance offered to pulling in cables or wires through conduits, after the conduits have been installed, is so great that the cables can only be introduced into long conduits under circumstances involving a possibility of injuring the insulation of the cables.

In order to pull a cable into and through conduits with a number of bends or elbows in the run, it has been necessary to resort to the use of mechanical power such as a winch or windlass or block and fall; and with the development of the introduction of conduits or raceways in buildings and other structures, the pull box or junction box has become, first a necessity; and then owing to the large number of conduits and cables, the introduction of pull boxes or junction boxes has become a fire hazard and menace to life and property, because in large installations it is customary to use pull boxes of great size where a great many conduits terminate and a great many sets of cables pass through; consequently, there is crossing of cables and crowding of cables, with the result of mechanical and electrical injury.

The fire underwriters' and electric code requirements call for the installation and protection of cables in conduit, and that circuits shall be carried separately in conduits, such requirements limiting the number of wires in conduits.

The object of my invention is to provide an improved separate junction sleeve for connecting conduits which are installed with spaces between them, which sleeve is slightly larger than the conduits which are to be connected thereby, whereby the sleeve can be temporarily slipped over one conduit far enough to cause a space to exist between the ends of the conduits, such space then permitting installing wires up to this point, or the pulling of cables or other operations to be effected in relation to wires or cables, after which the sleeve is then returned to conduit-connecting position.

Another object is to provide an improved support mountable within the junction sleeve, for gripping cables to support the weight thereof.

With the above-stated objects in view, my invention consists in the construction and combinations of parts substantially as hereinafter described and claimed.

Of the accompanying drawing:

Figure 1 is a longitudinal section of a complete assemblage of the sleeve and coupling members; parts being broken out to indicate that the length thereof may be as desired.

Figure 2 represents a section on line 2—2 of Figure 1, looking downward.

Figure 3 represents a section on line 3—3 of Figure 2.

Figure 4 is a perspective view of the cable-gripping members separated.

Figure 5 represents a section on line 5—5 of Figure 1, looking upward.

Figure 6 is a sectional view of the band member which encircles the cable-gripping members.

Similar reference characters designate similar parts or features in all of the views.

It is desirable to explain that the present invention is of the general type of that illustrated and described in Letters Patent No. 1,606,789, issued to me November 16, 1926, but is an improvement thereon as will be apparent from the following detailed description.

In Figure 1 the end portions of two conduits 12 in vertical alinement are illustrated as installed in or adjacent to a building portions of which are illustrated at A. For convenience of description, the lower conduit may be considered as the incoming conduit and the upper one as the outgoing conduit.

On the threaded end 13 of each conduit is mounted a bushing 14, preferably of suitable metal, said bushing having an in-turned ring-shaped portion 15 the inner edge of which is rounded as at 16. Adjacent to the other end of each bushing is a washer 17 and adjacent to said washer is a packing gland 18 of compressible and expansible material, said gland being confined between the washer 17 and the shoulder 19 of a coupling member 20 mounted on the conduit A and having internal threads 21 engaging threads 22 of the junction sleeve or tube 23. As so far described, the members are the same at both ends of the sleeve 23 for connecting the two conduits 12.

Referring now to Figures 2, 3 and 4, in connection with Figure 1, the support for gripping the cables 29 comprises three tapering members 24 of wood, or of bakelite or other suitable insulating material, each member 24 presenting grooves or semi-bore roughened inner surfaces 25 which are distorted out of a straight line. It will aid an understanding of this cable-supporting device by including a description of a preferred method of making it. When the said support is to grip three cables, a block of the material is turned to form a single round tapering member into which six borings are made to about the middle of its length, such borings being roughened as by screw-threading them, and then similar borings are made from the other end to meet the first borings. Then the single tapering and bored member is cut into three sections, the cuts intersecting the borings so as to produce three wedge-shaped pieces or members, each having two grooves in its inner face, said grooves being rough and not being straight from end to end, but what may be described as tortuous or crooked, as shown by comparing Figures 3 and 4. This results in the economical production of a three-member cable-gripper capable of easy installation and of absolute utility when installed as hereinafter described. Of course if for use with a single cable, or with two cables, then the single tapering member above referred to would have but one boring, or two borings, and would then be cut into two wedge-shaped members instead of three; but the borings would still be such as described, so that the cable-gripping grooves 25 would be rough and somewhat crooked.

I do not limit myself to this described method of making such members as illustrated in Figure 3, for when the material of which they are made permits it, they may be cast or molded.

Co-acting with the members 24 as presently described, is a ring or band 26 having an internal serrated or roughened surface, and provided with a flange 27 to bear on the end of the protective bushing 14.

The smaller end of each coupling member 20 is preferably externally hexagonal as illustrated in Figure 5, for engagement by a wrench, and also has a screw 28 tapped through it, the inner end of said screw being sufficiently pointed or sharp to pierce any coating that may be on the conduit 12, so as to insure proper grounding of any circuit in which the conduit may be included.

When the parts are to be installed, the procedure may be as follows:—

The incoming and outgoing conduits 12 may be installed within or outside any structure, with their screw-threaded ends 13 at such distance apart as may be predetermined and to accord with the length of the sleeve 23 that is provided for such spacing. The coupling members 20 are then slipped onto the conduits 12 somewhat beyond the positions illustrated in Figure 1 and temporarily secured by their screws 28. The packing glands 18 are then slipped over the conduits and into the members 20, the washers 17 then seated against the glands 18, and the bushings 14 screwed on the ends of the conduits, said bushings having rounded edge portions 16 which protect the insulation of the cables or wires when the latter are drawn in place. Whatever is desired to be done to, or in connection with installed cables, may now be effected, there being ample free space between the ends of the two conduits and the parts which have been mounted thereon as just described. But, as will now be described, the sleeve 23 may be fully installed before any cables or wires are installed, and then shifted to open the space at any later time.

To install the sleeve 23, one of the coupling members 20 (as the lower one in Figure 1) has its screw 28 loosened, and is slipped back on the incoming conduit 12 to a distance substantially equalling the length of the sleeve 23. Such slipping of the member 20 does not cause any shifting of either of the bushings 14 which remain with their rounded ends 16 in positions to prevent injury to the cables due to contact with the ends of the conduits, if such cables are then drawn through or otherwise handled in the space existing between the conduit ends.

While the shifted coupling member 20 remains in its lowered position just described, the cable support such as illustrated in Figures 3 and 4 (if needed for the installation that is to be effected) is placed in position by assembling the members thereof against the cables with the ring or band 26 surrounding said members. Such assemblage is then slipped into the bushing 14, and gently tapped down, closing the roughened and irregular or distorted grooves 25 against the cables and gripping the latter. Any weight or strain thereafter, by the cables, automatically forces the cable support 24 into tighter condition at two points, one being where the members 24 are in contact with the rounded rim 16 of the bushing 14, and the other being where the flange 27 of the wedge-embracing band 26 bears on the top of the bushing 14. Any shifting of the wedge members 24 downward, due to the weight of the cables which are gripped by said members, automatically increases the gripping action of said members because if the members 24 move slightly downward, the band 26 which encloses them can not be lowered due to its flange 27 bearing on the bushing 14.

The gripping of the cables as just described still leaves the space open above the support 24, and any such work as splicing, taping, soldering etc., can be preformed. To close this space and effect continuity of the conduit installation, the sleeve 23 is applied by slipping it to position where its lower end can have the lowered coupling 20 screwed to it, as by a wrench engaging the hexagonal portion of the latter, and then shifting these two joined members upward and screwing the upper member 20 to the upper end of the sleeve. This closes what has been a free space and causes such compression of the packing glands 18 as to effectually produce a water-tight and vapor-proof joint at each end of the space-enclosing sleeve.

By employing the sharp-tipped screws 28, capable of penetrating any coating on the conduit sections 12, I provide a continuous ground connection between the incoming and outgoing conduits.

A particular feature of my invention is that it not only serves as a junction sleeve, but also provides an expansion joint in the event that the conduit sections are so affected as to move toward or apart from each other. This is due to the employment of the compressible and expansible packing glands 18 which permit a fair amount of such relative movement, as the screws 28 do not bite into the conduits sufficiently to prevent such movement. If the conduits are in such locations as to be liable to material buckling or other strains, the glands 18 may be of any desired thickness so as to properly fulfill the objects thereof.

In practice, my invention provides a separate junction sleeve for each complete conduit, and said sleeve is slightly larger than the conduit so as to allow the temporary removal of the sleeve from its operative position, by slipping it over one of the conduit sections and thereby giving access to a space for permitting installation of a cable or cables up to that point, and for placing in the space a practical cable support if one is needed to maintain the cables during any operations connected therewith.

This junction sleeve further provides for access to a free space in which cables may be tested, spliced, removed or installed, and at the completion of any of such operations the sleeve may then be placed in position where it will insure the same protection to the cables in this space as provided by the conduits anywhere in the run and provide complete continuity of covering on all sides with a predetermined thickness of metal as established by the thickness of conduit wall. The sleeve also eliminates crowding as the interior predetermined area of conduit insures greater protective space than the standard which is set by the fire-underwriters and code authorities.

While I have illustrated my invention in connection with vertically installed conduit sections, it is to be understood that I do not limit myself thereto, as it is capable of advantageous use in horizontal or other positions.

And while I have illustrated but one cable support 24 and its surrounding band 25, coacting with one of the bushings 14, it is to be understood that if conditions make it desirable, said cable support and band or a duplicate thereof might be employed coacting with the other bushing 14. In others words, there can be two of the cable-gripping devices, one at each end of the sleeve, or but one of them at either end of the sleeve.

Having now described my invention, I claim:

1. The combination with a cable conduit, of a cable support comprising a plurality of wedge-shaped members all of the same formation and having rough-surfaced cable-gripping grooves, and a band enclosing said members, said band having an outwardly projecting flange.

2. The combination with a cable conduit, of a cable support comprising a plurality of wedge-shaped members all of the same formation and having distorted cable-gripping grooves, and a band enclosing said members, said band having an outwardly extending flange.

3. The combination with a cable conduit having a protecting bushing at its end, of a cable support comprising a plurality of wedge-shaped members having distorted rough-surfaced cable-gripping grooves, and a band enclosing said members and having a flange bearing on the said bushing.

4. A cable support for use in connection with a coupling for cable conduits, said support comprising a plurality of wedge-shaped members having distorted cable-gripping grooves, all of said members being substantially duplicates in formation.

5. A cable support for use in connection with a coupling for cable conduits, said support comprising a plurality of wedge-shaped members having rough-surfaced distorted cable-gripping grooves, all of said members being substantially duplicates in formation.

6. The combination with a cable conduit, of a cable support comprising a plurality of wedge-shaped members having cable-gripping grooves, said members being substantially duplicates in shape, and a band enclosing said members and free to shift lengthwise thereof.

7. The combination with a cable conduit, of a cable support comprising a plurality of wedge-shaped members having cable-gripping grooves, and a band enclosing said members, said band being free to shift relatively to other members of the support and presenting a tapering inner surface to snugly fit the outer surfaces of the said wedge-shaped members.

JOHN W. HOOLEY.